United States Patent
Gopal et al.

(10) Patent No.: US 10,218,739 B2
(45) Date of Patent: *Feb. 26, 2019

(54) FILTER FOR NETWORK INTRUSION AND VIRUS DETECTION

(71) Applicant: Intel Corporation, Santa Clara, CA (US)

(72) Inventors: Vinodh Gopal, Westborough, MA (US); Christopher F. Clark, Chandler, AZ (US); Gilbert M. Wolrich, Framingham, MA (US); Wajdi K. Feghali, Boston, MA (US)

(73) Assignee: Intel Corporation, Santa Clara, CA (US)

(*) Notice: Subject to any disclaimer, the term of this patent is extended or adjusted under 35 U.S.C. 154(b) by 146 days.

This patent is subject to a terminal disclaimer.

(21) Appl. No.: 15/049,519

(22) Filed: Feb. 22, 2016

(65) Prior Publication Data

US 2016/0255100 A1 Sep. 1, 2016

Related U.S. Application Data

(63) Continuation of application No. 12/346,734, filed on Dec. 30, 2008, now Pat. No. 9,270,698.

(51) Int. Cl.
*H04L 29/06* (2006.01)
*G06F 17/30* (2006.01)
(Continued)

(52) U.S. Cl.
CPC .............. *H04L 63/145* (2013.01); *G06F 7/02* (2013.01); *G06F 17/30949* (2013.01);
(Continued)

(58) Field of Classification Search
CPC ..................................................... H04L 63/145
See application file for complete search history.

(56) References Cited

U.S. PATENT DOCUMENTS

| 6,430,184 B1 | 4/2002 | Robins et al. |
| 7,085,988 B1 | 8/2006 | Weng |

(Continued)

FOREIGN PATENT DOCUMENTS

WO  2010077904 A2  7/2010

OTHER PUBLICATIONS

International Search Report and Written Opinion for PCT Patent Application No. PCT/US2009/068168, dated Jul. 29, 2010, 9 pages.

(Continued)

*Primary Examiner* — Andrew C Georgandellis
(74) *Attorney, Agent, or Firm* — Grossman, Tucker, Perreault & Pfleger, PLLC

(57) ABSTRACT

Methods and apparatus to perform string matching for network packet inspection are disclosed. In some embodiments there is a set of string matching slice circuits, each slice circuit of the set being configured to perform string matching steps in parallel with other slice circuits. Each slice circuit may include an input window storing some number of bytes of data from an input data steam. The input window of data may be padded if necessary, and then multiplied by a polynomial modulo an irreducible Galois-field polynomial to generate a hash index. A storage location of a memory corresponding to the hash index may be accessed to generate a slice-hit signal of a set of H slice-hit signals. The slice-hit signal may be provided to an AND-OR logic array where the set of H slice-hit signals is logically combined into a match result.

16 Claims, 4 Drawing Sheets

(51) Int. Cl.
*G06F 7/02* (2006.01)
*G06F 21/56* (2013.01)

(52) U.S. Cl.
CPC ...... *G06F 17/30985* (2013.01); *G06F 21/567* (2013.01); *H04L 63/0245* (2013.01); *H04L 63/1416* (2013.01); *G06F 2207/025* (2013.01)

(56) References Cited

U.S. PATENT DOCUMENTS

| | | | |
|---|---|---|---|
| 7,444,515 B2* | 10/2008 | Dharmapurikar | H04L 63/145 380/255 |
| 2002/0006195 A1 | 1/2002 | Venkatesan et al. | |
| 2005/0086520 A1 | 4/2005 | Dharmpurikar et al. | |
| 2005/0283714 A1 | 12/2005 | Korkishko et al. | |
| 2007/0014395 A1 | 1/2007 | Joshi et al. | |
| 2008/0130894 A1 | 6/2008 | Qj et al. | |
| 2008/0148025 A1 | 6/2008 | Gopal et al. | |
| 2009/0024826 A1* | 1/2009 | Zhang | G06F 7/724 711/216 |

OTHER PUBLICATIONS

Aho et al., "Efficient string matching: an aid to bibliographic search" Communications of the ACM, 18(6):333-340, 1975.

Boyer et al., "A fast string searching algorithm" Communications of the ACM, 20(10), pp. 762-772, 1977.

Dharmapurikar et al., "Deep packet inspection using Parallel Bloom Filters" Proceedings of the 11th Symposium on High-performance interconnects, 8 pages, Aug. 2003.

EP Search Report from Related EPO Application 09836863.2 dated May 29, 2012 (8 pages).

Ramaswamy et al, "Approximate Fingerprinting to Accelerate Pattern Matching", Proceedings of the 2006 ACM SIGCOMM Internet Measurement Conference, IMC 2006, ACM New York, USA, 6 pages.

Sertac et al. "Aggregated Bloom Filters for Intrusion Detection and Prevention Hardware", Proceedings of the Global Telecommunications Conference 2007.GLOBECOM '07 IEEE Piscataway, NJ, USA, 12 pages.

China Office Action from related China Application 200980153566.5 dated May 21, 2013 (14 pages of English translation and 7 pages of Chinese Office Action).

Supplementary Search Report received for European Patent Application No. 09836863.2, dated Jun. 15, 2012, 1 page only.

Office Action Received for Chinese Patent Application No. 200980153566.5, dated Dec. 19, 2013, 8 pages of Office Action including 5 pages of English Translation.

Office Action received for Chinese Patent Application No. 200980153566.5, dated Apr. 25, 2014, 3 pages of Office Action and 3 pages of English Translation.

David A. McGrew, "The Galois/Counter Mode of Operation (GCM)", Updated submission to NIST, Modes of Dperation Process, May 31, 2005, pp. 1-25. Available at: <http://csrc.nist.gov/groups/ST/toolkit/BCM/documents/proposedmodes/gcm/gcm-spec.pdf>.

International Preliminary Report on Patentability and Written Opinion received for PCT Patent Application No. PCT/US2009/068168, dated Jul. 14, 2011, 6 Pages.

* cited by examiner

FILTER FOR NETWORK INTRUSION AND VIRUS DETECTION

CROSS-REFERENCE TO RELATED APPLICATION

The present application is a continuation of U.S. patent application Ser. No. 12/346,734 titled "FILTER FOR NETWORK INTRUSION AND VIRUS DETECTION" filed on Dec. 30, 2008, the entire disclosure of which is incorporated herein by reference.

FIELD OF THE DISCLOSURE

This disclosure relates generally to the field of network processing. In particular, the disclosure relates to a novel filter architecture to accelerate string matching in packet inspection for network applications such as intrusion detection/prevention and virus detection.

BACKGROUND OF THE DISCLOSURE

In modern networks, applications such as intrusion detection/prevention and virus detection are important for protecting the networks and/or network users from attacks. In such applications network packets are often inspected to identify problematic packets by finding matches to a known set of data patterns. Matching every byte of an incoming data stream against a large database of patterns (e.g. up to hundreds of thousands) is very compute-intensive. Programs have used techniques such as finite-state machines and filters to find matches to known sets.

A Bloom filter, conceived by Burton H. Bloom in 1970, is a probabilistic structure for determining whether an element is a member of a set. Hashing is performed on the element. Multiple different hash functions are used to generate multiple different hash indices into an array of bits. To add or insert an element into the set, these hash functions are used to index multiple bit locations in the array for the element and these bit locations are then set to one. To query the filter for an arbitrary element the hash functions are used to index multiple bit locations in the array for the element and these bit locations are then checked to see if they are all set to one. If they are not all set to one, the arbitrary element in question is not a member of the set.

Whenever a filter generates a positive outcome for an element, which is not actually a member of the set, the outcome is called a false positive. The Bloom filter will not generate a false negative. It is a goal of any particular filter design, that the probability of false positives is "small." For Bloom filters, after inserting n elements into a set represented by an array of m bits using k different hash functions, the probability of a false positive is $(1-(1-1/m)^{kn})^k$.

Designing a filter for a specific problem may be tedious, and at high data rates it is difficult or impossible for state-of-the art processors to implement the design at rates even close to line-rate. To achieve rates close to one or more gigabits per second, specialized field-programmable gate array solutions or custom circuits have been proposed.

To date, more generalized reconfigurable architectures to accelerate string matching in packet inspection for network applications such as intrusion detection/prevention and virus detection have not been fully explored.

BRIEF DESCRIPTION OF THE DRAWINGS

The present invention is illustrated by way of example and not limitation in the figures of the accompanying drawings.

DETAILED DESCRIPTION

Methods and apparatus to perform string matching for network packet inspection are disclosed below. In some embodiments, a filter apparatus may be configured as a set of string matching slice circuits, each slice circuit of the set being configured to perform string matching steps in parallel with other slice circuits. Each slice circuit may include an input window storing some number of bytes of data from an input data steam. The input window of data may be padded if necessary, and may be multiplied by a distinct Galois-field polynomial modulo an irreducible Galois-field polynomial to generate a hash index. A storage location of a memory slice corresponding to the hash index may be accessed to generate a slice-hit signal of a plurality of slice-hit signals. The slice-hit signal may be provided to an AND-OR logic array where the plurality of slice-hit signals is logically combined into a match result.

Embodiments of such methods and apparatus represent reconfigurable architectures to accelerate string matching in packet inspection for network applications such as intrusion detection/prevention and virus detection.

In the following description, numerous specific details are set forth. However, it is understood that embodiments of the invention may be practiced without these specific details. In other instances, well-known circuits, structures and techniques have not been shown in detail in order not to obscure the understanding of this description. These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

Figure 1:
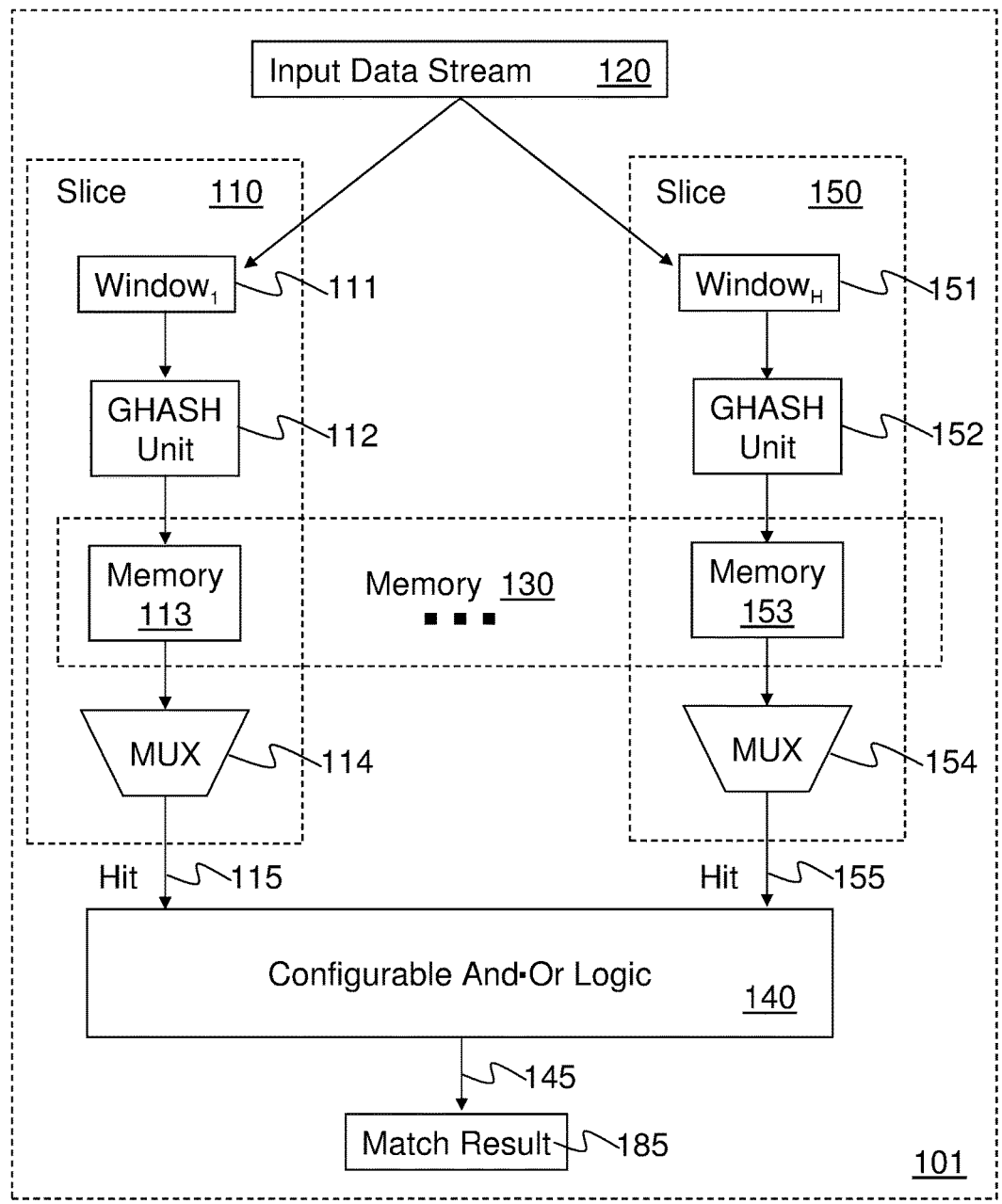
FIG. 1 illustrates one embodiment of a filter apparatus to accelerate string matching in packet inspection for network applications such as intrusion detection/prevention and virus detection.

FIG. 1 illustrates one embodiment of a filter apparatus 101 to accelerate string matching in packet inspection for network applications such as intrusion detection/prevention and virus detection. Filter apparatus 101 as shown includes an input data stream 120, which may be in a system memory or may comprise an optional data stream buffer of filter apparatus 101 for storing packed data for inspection and/or a pattern database to initialize filter apparatus 101. Filter apparatus 101 also includes a set of H (e.g. 1-8) slice circuits 110-150, each $i^{th}$ slice circuit of the set is configurable for providing an $i^{th}$ slice-hit signal to a configurable AND-OR logic array 140 as one of a set of H slice-hit signals. Slice circuits 110-150, respectively include input windows 111-151 each configurable to store $W_i$ (e.g. 2-8) bytes of data from input data steam 120, and Ghash units 112-152 coupled with input windows 111-151 and configurable to receive the $W_i$ bytes of data, to pad the $W_i$ bytes of data if necessary, and to multiply their respective $W_i$ bytes of data by a polynomial modulo an irreducible Galois-field polynomial to generate an index.

It will be appreciated that some embodiments of filter apparatus 101 may use the same irreducible Galois-field polynomial in each of the Ghash units 112-152 with H distinct polynomial multipliers selected at random (each having a good mixture of 1's and 0's) to generate H distinct hash indices, thus simplifying the task of generating distinct hash indices for each Ghash unit. It will also be appreciated that in embodiments of filter apparatus 101 where, unlike the Bloom filter, input windows 111-151 are independently configurable to store $W_i$ bytes of data from input data steam 120, the filter apparatus 101 may be used to solve multiple problems of different sizes (e.g. a 2-byte match, a 3-byte match, a 6-byte match, and an 8-byte match, etc.) at the same time in parallel.

Slice circuits 110-150, respectively, also include memories 113-153 coupled with the Ghash units 112-152 and configurable to access respective storage locations responsive to their respective indices (e.g. at the addresses specified by some field of bits from respective indices) to each generate an $i^{th}$ slice-hit signal and to provide the an $i^{th}$ slice-hit signal to AND-OR logic array 140 as one of the set of H slice-hit signals 115-155. Some embodiments of memories 113-153 are configurable from a larger memory 130 to serve as individual memories 113-153 for slice circuits 110-150 respectively. Some alternative embodiments of memories 113-153 may be N-entry (e.g. 1K entries) read/write random-access memories (RAMs) of fixed width (e.g. 64-bits wide) and are configurable to be combined into larger memories (e.g. memory 130) as necessary (e.g. when a very large set of patterns is required). Slice circuits 110-150 may also include multiplexers 114-154, respectively, configurable to access respective bit storage locations responsive to portions of their respective indices to generate the $i^{th}$ slice-hit signal and to provide the $i^{th}$ slice-hit signal to AND-OR logic array 140 as one of the set of H slice-hit signals 115-155.

AND-OR logic array 140 is configurable to receive a set of H slice-hit signals 115-155 and to combine the set of H slice-hit signals 115-155 into a match result 145, a copy of which may be stored as a match result 185. Some embodiments of AND-OR logic array 140 may be configurable to perform a simple AND (e.g. as in a Bloom filter) or a simple OR (e.g. as in solving multiple problems of different sizes in parallel) of the set of H slice-hit signals 115-155 to get a match result 145. Alternative embodiments of AND-OR logic array 140 may be configurable to perform a complex AND-OR of the set of H slice-hit signals 115-155 (e.g. $temp_k$=(AND slice-hit signal$_i$ for all i in a set $S_k$) and then the final match result=(OR $temp_k$ for all k)) to get a match result 145. The complex AND-OR of the set of H slice-hit signals 115-155 may be used, for example, in embodiments of filter apparatus 101 to provide multiple Bloom filters in parallel.

It will be appreciated that when a final match result is positive, a verification process may be used to check against false positives. Such verification process may be relatively slower than using filter apparatus 101 and so the configuration of filter apparatus 101 should be carefully made to avoid frequent false positives.

Figure 2:
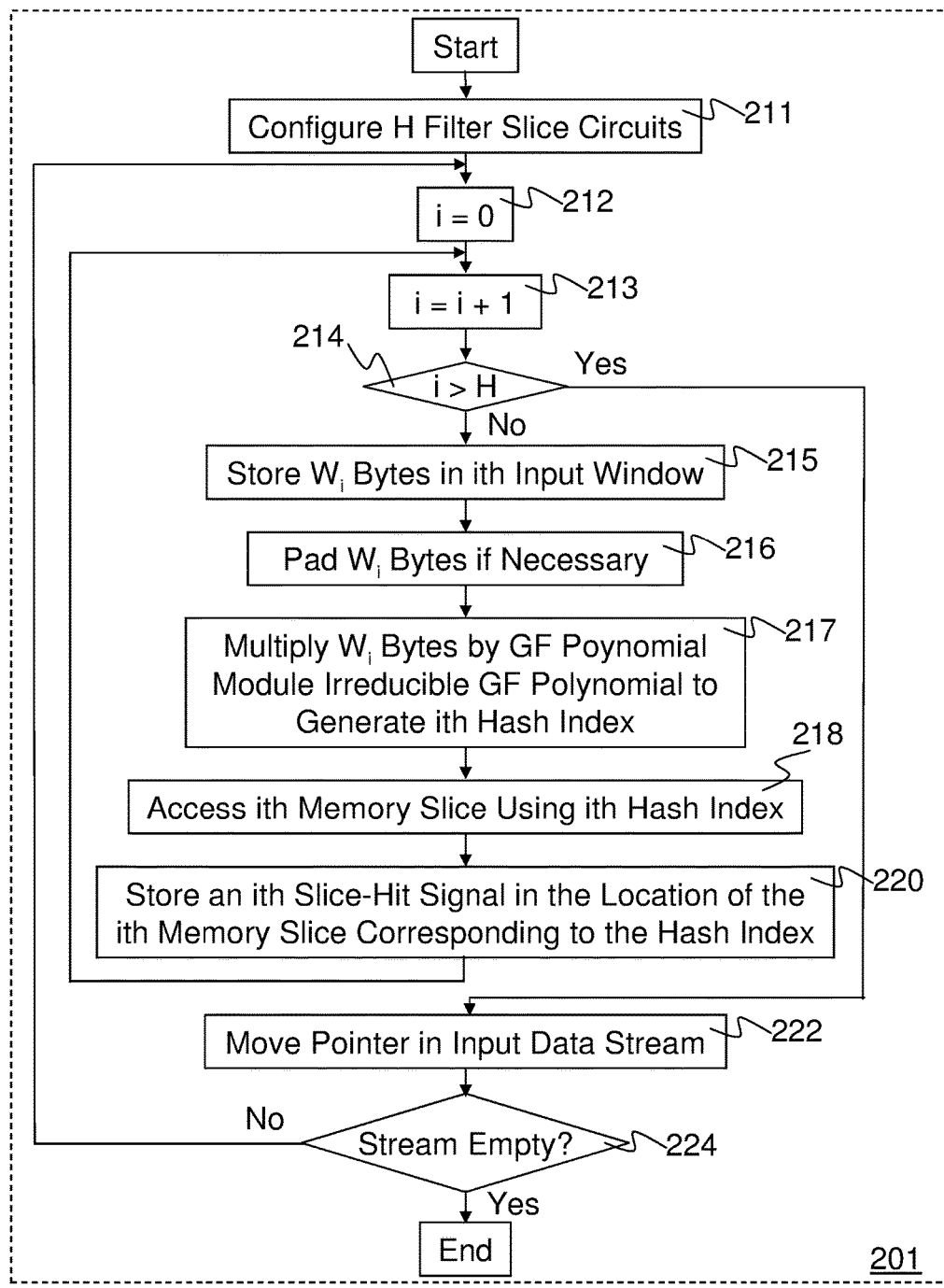
FIG. 2 illustrates a flow diagram for one embodiment of a process to initialize a filter apparatus for string matching in packet inspection.

FIG. 2 illustrates a flow diagram for one embodiment of a process 201 to initialize a filter apparatus for string matching in packet inspection. Process 201 and other processes herein disclosed are performed by processing blocks that may comprise dedicated hardware or software or firmware operation codes executable by general purpose machines or by special purpose machines or by a combination of both.

In processing block 211 a set of H slice circuits are configured. In processing block 212, i is set to zero (0). In processing block 213, i is incremented. In processing block 214, i is checked to see if it has exceeded H. It will be appreciated that even though initialization of the H slice circuits is shown as an iterative process 201, in at least some preferred embodiment of process 201, the set of H slice circuits are configured to concurrently perform initialization according to processing blocks 215-220 of process 201 for use in string matching during network packet inspections. Therefore, for each of the H slice circuits processing blocks 215-220 are executed as follows, before proceeding to processing block 222.

In processing block 215 $W_i$ bytes of data is stored from an input data steam in an $i^{th}$ input window. In processing block 216 the $W_i$ bytes of data are padded if necessary. Then in processing block 217 the $W_i$ bytes of data are multiplied by a Galois-field polynomial modulo an irreducible Galois-field polynomial to generate an $i^{th}$ hash index. In processing block 218 a storage location of a memory corresponding to the $i^{th}$ hash index is accessed, and in processing block 220 an $i^{th}$ slice-hit signal is stored (i.e. set) in the storage location of the memory corresponding to the $i^{th}$ hash index. When all of the H slice circuits have completed processing blocks 215-220 of process 201, processing proceeding to processing block 222 where a pointer in the input data stream is moved (e.g. to a new string in the database). Then from processing block 224, if the data stream is empty processing terminates. Otherwise processing repeats in processing block 212.

It will be appreciated that the process 201 may be iterated for hundreds to hundreds of thousands of times in order to initialize a filter apparatus for string matching patterns in packet inspection. Thus when the set of H slice circuits are configured to concurrently perform initialization substantial performance improvements may be realized. It will also be appreciated that the process 201 of initializing a filter apparatus (by setting slice-hit signals) may be performed in a manner substantially similar to a process of utilizing a filter apparatus for string matching (by reading the slice-hit signals) in packet inspection. In some embodiments of processing block 222 a pointer into the input data stream may moved for each $i^{th}$ slice, in such a way as to provide each $i^{th}$ slice with a new compete pattern, whereas in utilizing a filter apparatus for string matching a pointer into the input data stream may be simply incremented.

Figure 3:
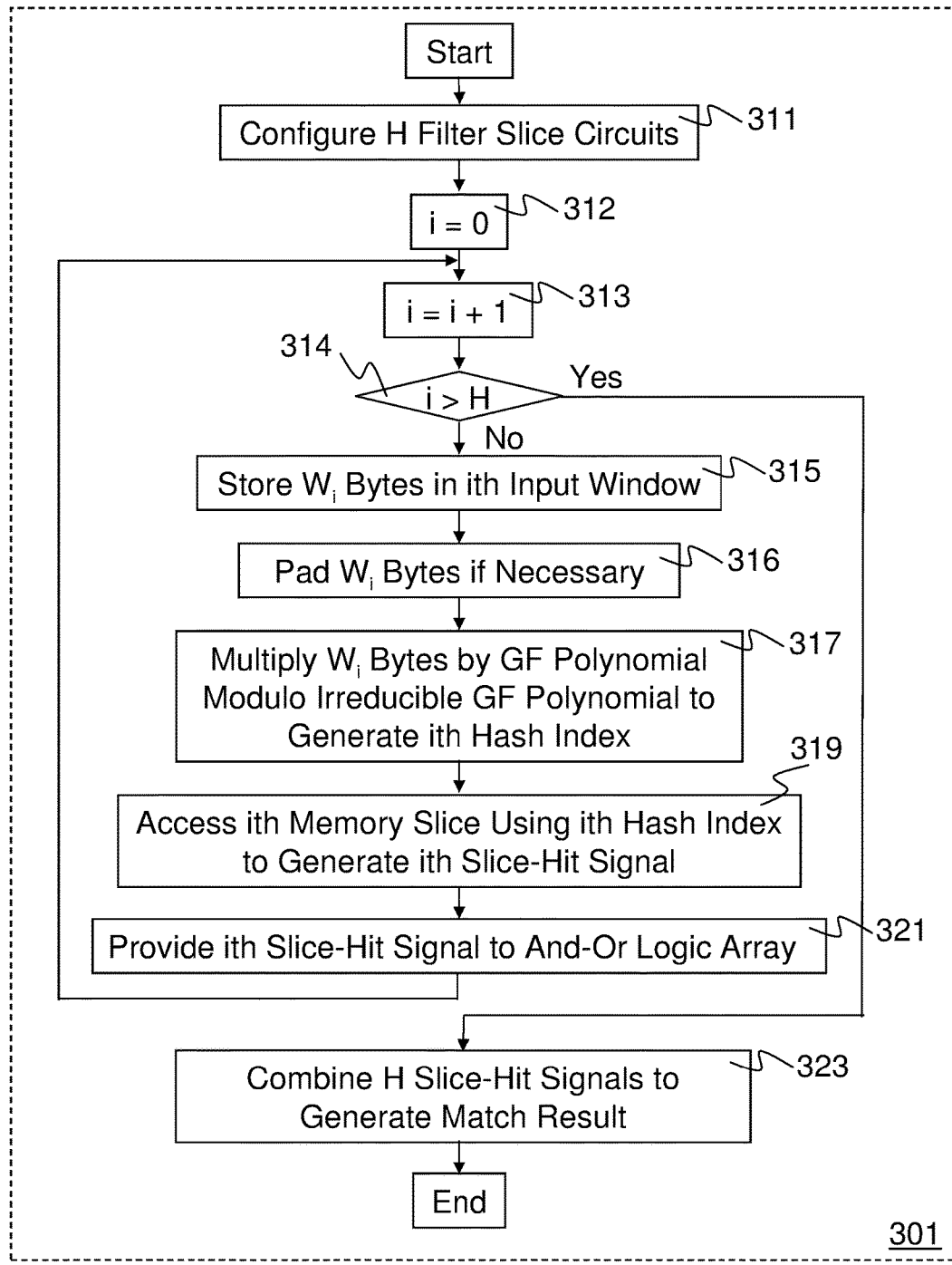
FIG. 3 illustrates a flow diagram for one embodiment of a process to utilize a filter apparatus for string matching in packet inspection.

FIG. 3 illustrates a flow diagram for one embodiment of a process 301 to utilize a filter apparatus for string matching in packet inspection. In processing block 311 a set of H slice circuits are configured. In processing block 312, i is set to zero (0). In processing block 313, i is incremented. In processing block 314, i is checked to see if it has exceeded H. Again, it will be appreciated that even though utilization of the H slice circuits is shown as an iterative process 301, in at least some preferred embodiment of process 301, the set of H slice circuits are configured to concurrently perform string matching according to processing blocks 315-321 of process 301 for use during network packet inspections. Therefore, for each of the H slice circuits processing blocks 315-321 are executed as follows, before proceeding to processing block 323.

In processing block 315 $W_i$ bytes of data is stored from an input data steam in an $i^{th}$ input window. In processing block 316 the $W_i$ bytes of data are padded if necessary. Then in processing block 317 the $W_i$ bytes of data are multiplied by a Galois-field polynomial modulo an irreducible Galois-field polynomial to generate an $i^{th}$ hash index. In processing block 319 a storage location of a memory corresponding to the $i^{th}$ hash index is accessed to generate an $i^{th}$ slice-hit signal of a set of H slice-hit signals. In processing block 321 the $i^{th}$ slice-hit signal is provided to an AND-OR logic array as one of the set of H slice-hit signals. When all of the H slice circuits have completed processing blocks 315-321 of process 301, processing proceeding to processing block 323 where the AND-OR logic array is configured to receive the set of H slice-hit signals and to combine the set of H slice-hit signals into a match result. Then from processing block 323 processing terminates.

It will be appreciated that iterations of process 301 may be configured in accordance with embodiments of filter apparatus 101 to substantially accelerate string matching in packet inspection.

Figure 4:
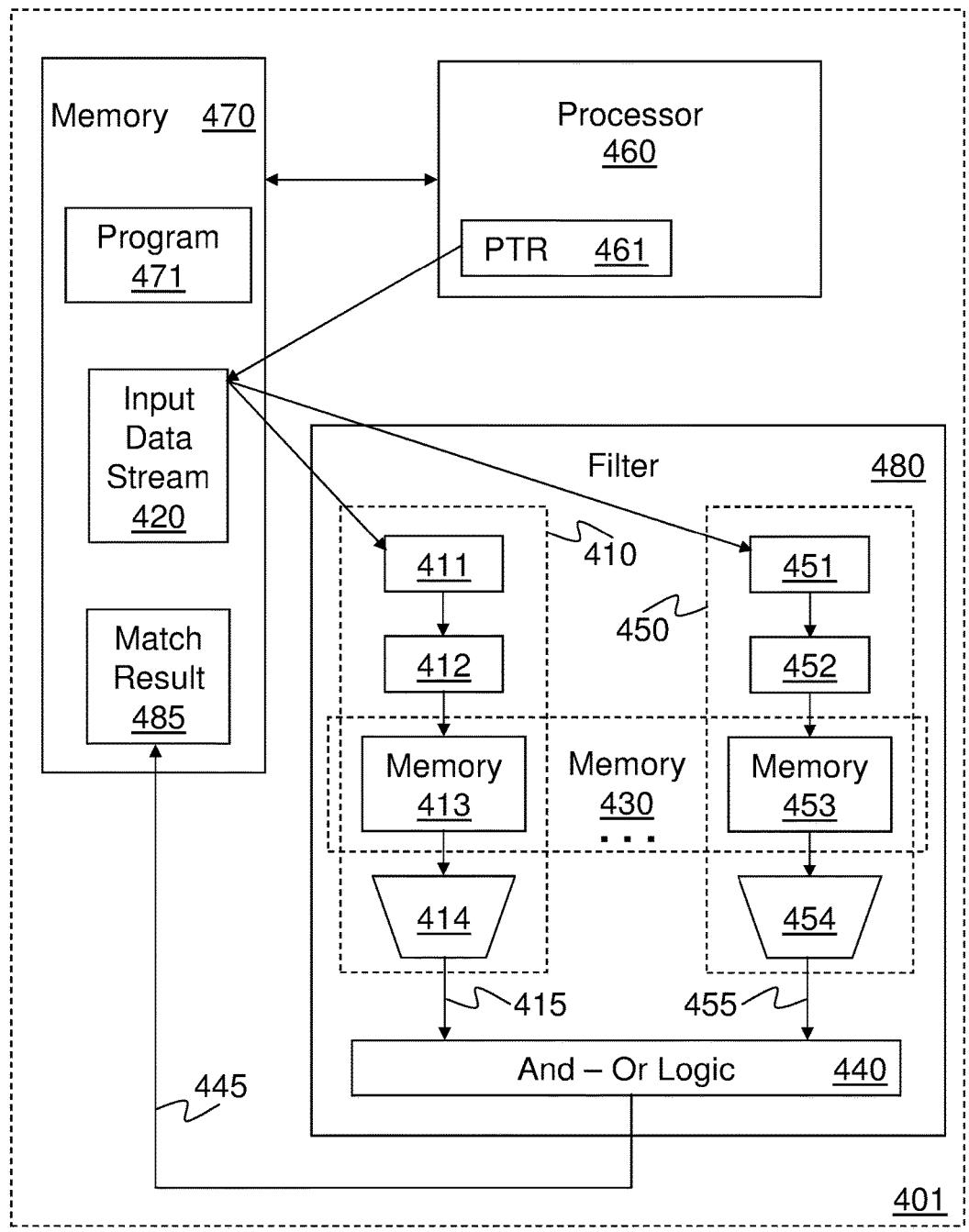
FIG. 4 illustrates one embodiment of a system employing a filter apparatus to accelerate string matching in packet inspection for network applications such as intrusion detection/prevention and virus detection.

FIG. 4 illustrates one embodiment of a system 401 employing a filter 480 to accelerate string matching in packet inspection for network applications such as intrusion detection/prevention and virus detection.

System 401 includes an input data stream 420, which may be in system memory 470 as shown, or may comprise an optional data stream buffer of filter 480 for storing packed data for inspection and/or a pattern database to initialize filter 480.

Filter 480 includes a set of H slice circuits 410-450, each $i^{th}$ slice circuit of the set is configurable for providing an $i^{th}$ slice-hit signal to a configurable AND-OR logic array 440 as one of a set of H slice-hit signals. Slice circuits 410-450, respectively include input windows 411-451 each configurable to store $W_i$ bytes of data from input data steam 420, and Ghash units 412-452 coupled with input windows 411-451 and configurable to receive the $W_i$ bytes of data, to pad the $W_i$ bytes of data if necessary, and to multiply their respective $W_i$ bytes of data by a polynomial modulo an irreducible Galois-field polynomial to generate an index.

Slice circuits 410-450, respectively, also include memories 413-453 coupled with the Ghash units 412-452 and configurable to access respective storage locations responsive to their respective indices to each generate an $i^{th}$ slice-hit signal and to provide the an $i^{th}$ slice-hit signal to AND-OR logic array 440 as one of the set of H slice-hit signals 415-455. Memories 413-453 may be N-entry read/write RAMs of any fixed width and configurable to be combined into larger memories (e.g. memory 430) as necessary. Alternatively some embodiments of memories 413-453 may be configurable from a larger memory 430. Slice circuits 410-450 may also include multiplexers 414-454, respectively, configurable to access respective bit storage locations responsive to portions of their respective indices to generate the $i^{th}$ slice-hit signal and to provide the $i^{th}$ slice-hit signal to AND-OR logic array 440 as one of the set of H slice-hit signals 415-455. AND-OR logic array 440 may receive the set of H slice-hit signals 415-455 and combine the set of H slice-hit signals 415-455 into a match result 445.

System 401 also includes system processor 460 to executed a program 471 in system memory 470 to accelerate string matching in packet inspection for network applications using filter 480, and to move or increment a pointer 461 into input data stream 420 until a match result 445 is positive (in the case of string matching for packet inspections) or until an end-of-file is reached in the input data steam 420. In some embodiments of system 401, processor 460 may check a copy of match result 445 stored in system memory 470 as a match result 485 when string matching for packet inspections to determine if match result 445 was positive.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method to perform string matching for network packet inspection, the method comprising:
   identify an irreducible Galois-field polynomial;
   for each $i^{th}$ slice circuit of a set of H slice circuits, performing the steps of:
      independently storing an $i^{th}$ input window of $W_i$ bytes of data from an input data stream;
      multiplying the $W_i$ bytes of data by a Galois-field polynomial modulo the irreducible Galois-field polynomial multiplied by one of a set of H distinct polynomial multipliers, wherein the one of the set of H distinct polynomial multipliers is randomly selected to generate an $i^{th}$ hash index; and
      accessing a storage location of a memory corresponding to the $i^{th}$ hash index to generate an $i^{th}$ slice-hit signal of a set of H slice-hit signals;
   combining the set of H slice-hit signals, with an AND-OR logic array, to identify a match result; and
   in response to a positive match, initiating a verification process to check against false positives.

2. The method of claim 1 further comprising storing the $i^{th}$ slice-hit signal in the storage location of the memory corresponding to the $i^{th}$ hash index.

3. The method of claim 2 wherein each $i^{th}$ input window of $W_i$ bytes of data from the input data stream comprises a complete data pattern.

4. The method of claim 2 further comprising reading out the $i^{th}$ slice-hit signal, from the storage location of the memory corresponding to the $i^{th}$ hash index, to the AND-OR logic array as the $i^{th}$ one of the set of H slice-hit signals.

5. The method of claim 2 further comprising multiplexing the $i^{th}$ slice-hit signal from the storage location of the memory corresponding to the $i^{th}$ hash index, to the AND-OR logic array as the $i^{th}$ one of the set of H slice-hit signals.

6. The method of claim 1, wherein the AND-OR logic array is configured to receive the set of H slice-hit signals and to logically AND the set of H slice-hit signals into the match result.

7. The method of claim 1, wherein the AND-OR logic array is configured to receive the set of H slice-hit signals and to logically OR the set of H slice-hit signals into the match result.

8. The method of claim 1, wherein the AND-OR logic array is configured to receive the set of H slice-hit signals and to logically AND subsets of the set of H slice-hit signals into temporary results, and to logically OR the temporary results into the match result.

9. An apparatus comprising:
   an AND-OR logic array configurable to receive a set of H slice-hit signals and to combine the set of H slice-hit signals into a match result; and
   a set of H slice circuits, each $i^{th}$ slice circuit of the set comprising:
      an input window configurable to independently store $W_i$ bytes of data from an input data stream;
      a Ghash unit coupled with the input window and configurable to identify an irreducible Galois-field polynomial, receive the $W_i$ bytes of data, and multiply the $W_i$ bytes of data by a Galois-field polynomial modulo the irreducible Galois-field polynomial multiplied by one of a set of H distinct polynomial multipliers, wherein the one of the set of H distinct polynomial multipliers is randomly selected to generate an index; and a memory coupled with the Ghash unit and configurable to access a storage location responsive to the index to generate a slice-hit signal and to provide the slice-hit signal to said AND-OR logic array as one of the set of H slice-hit signals.

10. The apparatus of claim 9, wherein providing the slice-hit signal to the AND-OR logic array comprises:

reading out the slice-hit signal, from the storage location of the memory corresponding to the index of the $i^{th}$ slice circuit, to the AND-OR logic array as the $i^{th}$ one of the set of H slice-hit signals.

11. The apparatus of claim 9, wherein providing the slice-hit signal to the AND-OR logic array comprises:

multiplexing the slice-hit signal, from the storage location of the memory corresponding to the index of the $i^{th}$ slice circuit, to the AND-OR logic array as the $i^{th}$ one of the set of H slice-hit signals.

12. The apparatus of claim 9, wherein the AND-OR logic array is configurable to receive the set of H slice-hit signals and to logically AND the set of H slice-hit signals into the match result.

13. The apparatus of claim 9, wherein the AND-OR logic array is configurable to receive the set of H slice-hit signals and to logically OR the set of H slice-hit signals into the match result.

14. The apparatus of claim 9, wherein the AND-OR logic array is configurable to receive the set of H slice-hit signals and to logically AND subsets of the set of H slice-hit signals into temporary results, and to logically OR the temporary results into the match result.

15. A packet processing system to perform string matching for network packet inspection, the system comprising:

a system processor;

an AND-OR logic array configurable to receive a set of H slice-hit signals and to combine the set of H slice-hit signals into a match result; and a set of H slice circuits, each $i^{th}$ slice circuit of the set comprising:

an input window configurable to independently store $W_i$ bytes of data from an input data stream;

a Ghash unit coupled with the input window and configurable to identify an irreducible Galois-field polynomial, receive the $W_i$ bytes of data, and multiply the $W_i$ bytes of data by a Galois-field polynomial modulo the irreducible Galois-field polynomial multiplied by one of a set of H distinct polynomial multipliers, wherein the one of the set of H distinct polynomial multipliers is randomly selected to generate an index; and a memory coupled with the Ghash unit and configurable to access a storage location responsive to the index to generate a slice-hit signal and to provide the slice-hit signal to said AND-OR logic array as one of the set of H slice-hit signals; and a machine readable medium to store executable instructions, such that when said executable instructions are executed by the system processor, the system processor is caused to:

set a pointer to a first character of the input data stream to establish a starting point for the input window of each $i^{th}$ slice circuit, and increment the pointer until the match result is positive or until an end-of-file is reached in the input data stream.

16. The system of claim 15, wherein the AND-OR logic array is configurable to receive the set of H slice-hit signals and to logically AND the set of H slice-hit signals into the match result.

* * * * *